P. M. LINCOLN.
VOLT AMPERE METER.
APPLICATION FILED NOV. 29, 1913. RENEWED SEPT. 13, 1915.
1,156,413.
Patented Oct. 12, 1915.
2 SHEETS—SHEET 1.
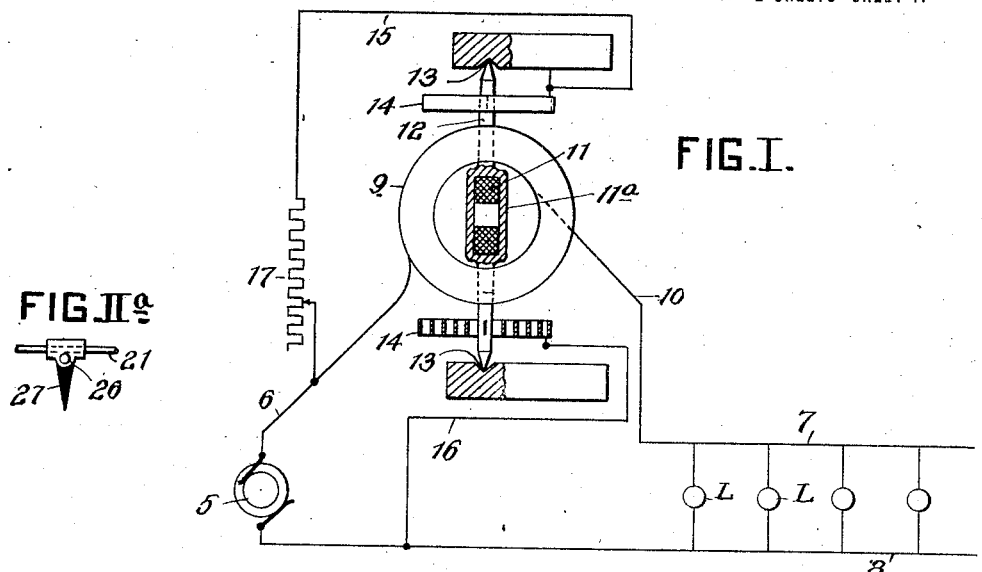
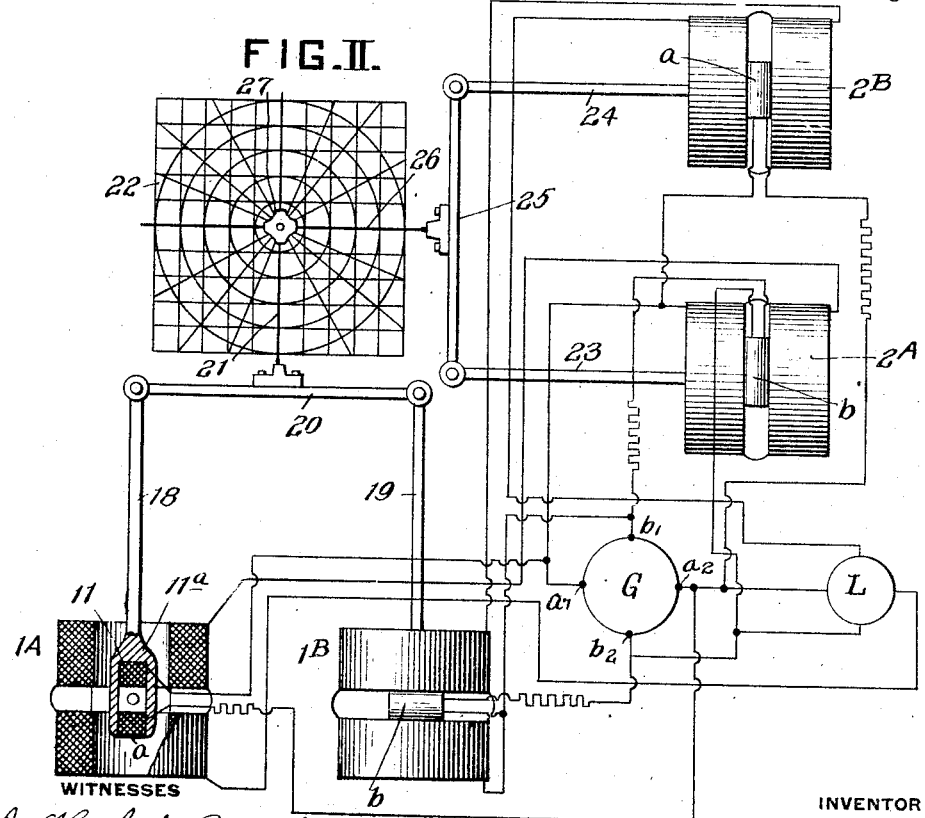
WITNESSES
J. Herbert Bradley.
Fredk Staub
INVENTOR
Paul M. Lincoln
By F. W. H. Clay his atty.

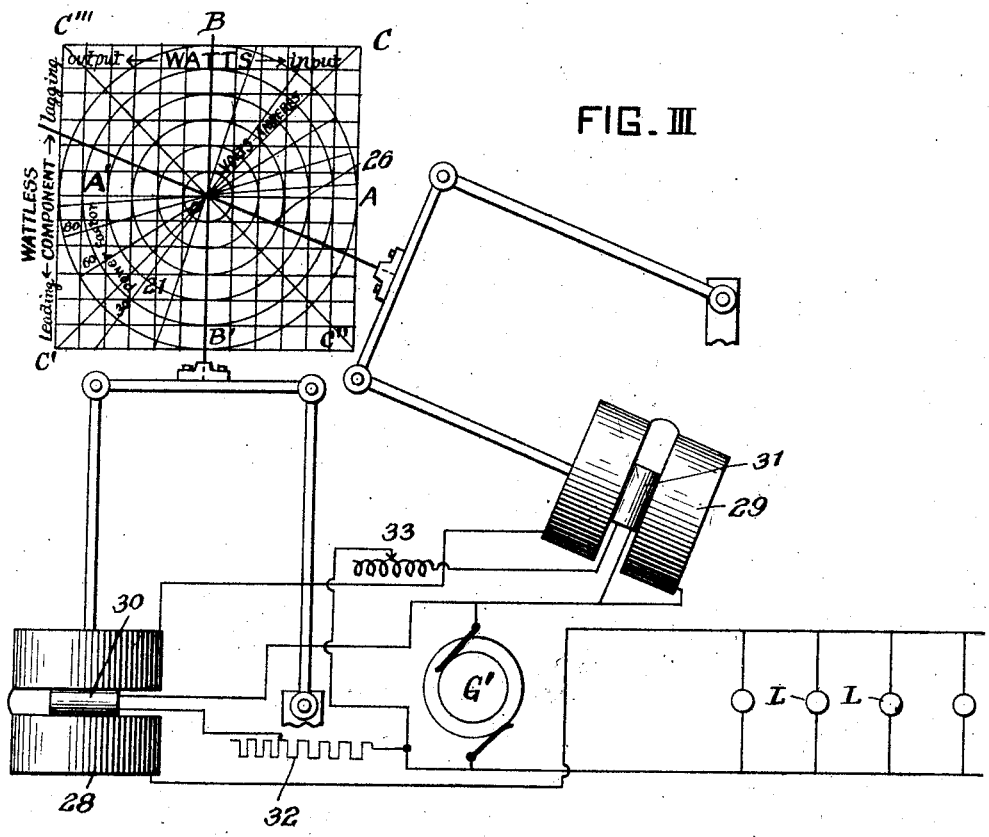

UNITED STATES PATENT OFFICE.

PAUL M. LINCOLN, OF PITTSBURGH, PENNSYLVANIA.

VOLT-AMPERE METER.

1,156,413.  Specification of Letters Patent.  Patented Oct. 12, 1915.

Application filed November 29, 1913, Serial No. 803,681. Renewed September 13, 1915. Serial No. 50,525.

*To all whom it may concern:*

Be it known that I, PAUL M. LINCOLN, a citizen of the United States, residing at Pittsburgh, in the State of Pennsylvania, have invented certain new and useful Improvements in Volt-Ampere Meters, of which the following is a specification.

My invention relates generally to electric measuring instruments and more particularly to methods of, and instruments for, measuring the electrical power of alternating currents, its primary object being to provide a method and an instrument which will not only give the true watts in a circuit, but will also indicate other quantities as well, including the volt-amperes and power factor.

I have shown an embodiment of my invention in the accompanying drawings, wherein—

Figure I. is a diagram of circuits and a partial section of a watt meter, arranged for proper measurement of the electrical power of a circuit; and Fig. II. is a similar figure, showing the combination of a watt meter and a wattless component meter with a series of scales 22 for indicating both of these quantities and at the same time the volt-amperes and the power factor. Fig. II$^a$. is a side elevation of the intersecting pointer arrangement 21, 26, shown in plan in Fig. II. Fig. III. shows another arrangement for use with single phase loads.

It is well known that a measure representing the volt-amperes of a circuit may be resolved into two components, one of which is the true watts in that circuit, and the other of which is known as the wattless component; these two components being at right angles to each other. It is also known that when the quantity representing volt-amperes in alternating current work is so resolved into such two components, it is completely determined thereby, both in magnitude and in direction. For illustration, refer first to the scale diagram at the left side of Fig. III., assume that the line OC represents in length and direction a certain value of volt-amperes which it is desired to determine; and suppose further that these volt-amperes are what is known as lagging, as exemplified, for instance, by the kind of volt-amperes taken by an under-excited synchronous motor. If the line OA represents the true watt component of the quantity represented by the line OC, and the line OB represents the wattless component, the angle AOB being a right angle, those skilled in the art are aware that a watt meter properly applied to a quantity represented by OC will measure the true component OA. It is also known that a watt meter may be so modified in its connections as to measure the wattless component OB, if desired; for instance, by changing the shunt connection of the watt meter so as to be 90 electrical degrees displaced from the condition wherein the true watts are correctly indicated.

It must be understood that the quantity represented by line OC may be subject to continual change both in magnitude and direction. It is possible to arrange a watt meter so as to measure the magnitude of the projection of the line OC in any desired direction, it being most usual to so choose this direction that that projection of the line being measured represents the true watts as above explained. It is, however, quite feasible to choose any other direction for the resolution of the quantity represented by line OC; and I am not confined to the direction that represents the true energy and the direction at right angles thereto, though for the purpose of my invention it is most useful and convenient to so resolve the quantity being measured.

It may be desirable to determine the direction of energy flow and also whether the wattless component is lagging or leading. For example, we have assumed that the line OC represents the volt-amperes taken by a load running at a lagging power factor. But if we assume the same value of leading power factor, the component OB would be reversed in direction so that on the illustrating diagram in Fig. III. it would be represented by the line OB' instead of OB; and likewise the quantity OC would be changed in direction and appear as OC''. Furthermore, if the machine, instead of being a motor became a generator, delivering the same amount of power it formerly took, the wattless component still being in the direction represented by line OB', the true watt component OA would be reversed in direction, becoming OA', and the line OC would take the position OC''. If we assume further that we still have a generator but that the generator takes a lagging current from the line instead of a leading current, the quantity OC will take the direction OC'''. My invention provides an instrument by which all these changes in direction are recognized by a corresponding change in the position of the index upon the indicating dial of the instrument. That is to say, I first resolve the volt-amperes into components, as above described, and then recombine the watt component and wattless component in such manner that their resultant will be the volt-amperes I wish to measure. The resulting instrument, therefore, indicates the direction and the magnitude of the true watt component, the wattless component, the resultant of these—the volt-amperes—and the power factor.

Referring first to Fig. I., the diagram represents a generator 5, feeding a circuit 6, 7, 8, containing a load LL, which we desire to determine. The current is passed through a stationary coil 9, returning by the lead 10 to the line 7, and within the coil 9 is mounted a movable coil 11 supported on trunnions 12, having pivots 13, 13, but restrained in its movements by spiral springs 14, 14. The coil 11 is connected in shunt with a load L, by the leads 15 and 16, one of which contains a suitable non-inductive resistance 17, and connection to coil 11 may be made by means of the restraining springs 14. This is a well known form of meter, in which the torque on the movable coil 11 will be proportional to the product of the current in the series coil 9 multiplied by the current in the movable coil 11 multiplied by the cosine of the phase angle between them; in other words, the angle of deflection of the coil 11 is proportional to the true energy of the load L, and a pointer attached to the coil 11 in any suitable manner would, therefore, represent the true energy absorbed by the load L. The particular kind of watt meter used is, however, not essential to my invention.

Referring now to Fig. II., I have shown a two phase generator G in circuit with any two phase load L, and connected with this I have two watt meters $1^A$ and $1^B$, connected in phases A and B, respectively, and two wattless component meters $2^A$ and $2^B$ connected, respectively, in phases A and B, as shown by the lead connections $a^1$, $a^2$, $b^1$, $b^2$, on the machine G. That is, the stationary coils of the meters $1^A$ and $2^A$ are in circuit with the phase A leads from the generator, and the stationary coils of meters $1^B$ and $2^B$ are in circuit with the phase B of the generator; while the movable coils of meter $1^A$ and $2^B$ are in shunt across the A phase and the movable coils of meters $2^A$ and $1^B$ are in shunt across the B phase of the generator. (For convenience the phase letters $a$, $b$, are marked on the movable coils in each instance.) Thus each of the watt meters $1^A$ and $1^B$ combine current and voltages which are derived from the same phase, while each of the wattless component meters $2^A$ and $2^B$ combine current with voltages that are 90 electrical degrees from the phase relations in meters $1^A$ and $1^B$. The watt meters $1^A$, $1^B$, instead of carrying individual pointers, carry the arms 18 and 19 connected by a link 20, carrying rigidly a thin stiff rod 21, which will obviously travel in a horizontal direction over the indicating dial 22. Similarly the wattless component meters $2^A$ and $2^B$ carry the angularly movable arms 23 and 24, respectively, which are pivoted to the link 25 carrying the thin stiff rod 26 traveling over the indicator dial 22 in a vertical direction, or a direction at right angles to the movement of the rod 21. These two rods 21 and 26, may be arranged to slide loosely in a pointer block 27, as shown in Fig. II$^a$, so that the pointer may be moved in any direction in a plane by the conjoint action of the two rods 21, 26. Obviously, the horizontal position of the pointer 27 is determined solely by the watt meters $1^A$ and $1^B$, while the vertical position is determined solely by the wattless component meters $2^A$, $2^B$. When the two rods are moved, the horizontal movement of the index 27 will show the true watts and the vertical movement of the index 27 will show the wattless component. The circles, by indicating the total distance of movement will show the volt-amperes, while the radiating lines will show the power factor.

It is, of course, evident that when measuring single phase power I have need only of a single meter for each of the functions, and I conveniently arrange the instrument for such cases as shown in Fig. III., which will be of value with single phase loads and also where another phase of the generator is not available.

G' is a generator and LL the load as before; and it will be observed that the stationary coils of the watt meter 28 and of the wattless component meter 29 are in series in the circuit, while the movable coils 30 and 31 are in shunt. The shunt circuit of the watt meter 28 contains a non-inductive resistance 32 as usual, while in series with the wattless component meter, I place an inductance 33 for the purpose of causing a lag in the shunt current of the wattless component meter. It is, however, impossible by such means to cause a phase difference of 90 degrees between the shunt current in coil 30 and that in coil 31; so that the wattless component meter 29 will not resolve the volt-amperes being measured into a component 90 degrees from the true watt component, but will indicate the value of a component at something less than 90 degrees from the true watt component. In other words, the wattless component meter does not measure the true wattless component, but a component lying somewhere between the true watt component and the true wattless component.

I compensate for this failure to cause a complete 90 degree relation between shunt currents by making the mechanical angle between the pointer arms 21, 26, of these instruments, the same as the electrical angle between their shunt elements. It will be apparent then that as before, the position of the intersection of the arms 21 and 26 will indicate the true watts, volt-amperes, the value of the wattless component, and the power factor. It will be understood that my invention is not limited to any particular form of meter or any particular arrangement of circuits, so long as the quantity under measurement is resolved into two components at an angle to each other, and then again their effects combined on an indicator, as herein described.

Various advantages of the method and of these devices will occur to those familiar with the art.

Having thus described my invention and illustrated its use, what I claim is the following:

1. The method of measuring the volt-amperes of an alternating current circuit which comprises moving one indicator in proportion to the true watts of the circuit to be measured, and moving another indicator in proportion to the wattless component of the current in the circuit, and moving an index by the conjoint action of said two indicators, whereby to show the true watts, the wattless component, the volt-amperes and the power factor, substantially as described.

2. The method of measuring the volt-amperes of an alternating current circuit by resolving the volt-amperes of the circuit into two components at an electrical angle to each other, utilizing said components to produce indicating motions at a mechanical angle to each other approximately equal to said electrical angle, and combining said motions to control an index, substantially as described.

3. The method of measuring the electrical quantities pertaining to an alternating current circuit, which consists in separately measuring several components of the apparent energy of the current traversing the circuit, and combining the said component measurements to produce a joint indication, substantially as described.

4. A volt-ampere meter comprising mechanism moved by and proportional to the true energy of the circuit to be measured, mechanism moved by and proportional to the wattless component of the current and an indicator operated by the joint action of said mechanisms.

5. A volt-ampere meter comprising a plurality of watt meters in different phases of a circuit and a mechanism moved thereby proportional to the true energy of the circuit, combined with a plurality of watt meters in different phases of the wattless component of the current and mechanism moved thereby and proportional thereto, and means indicating the combined movements of said mechanisms, substantially as described.

6. The combination with a composite indicating dial, of two indicating arms moved in lines at right angles to each other and intersecting over the dial, means to move one of said arms in proportion to the true energy and means to move the other of said arms by the wattless component of the circuit under measurement.

7. An electric meter comprising mechanisms actuated respectively by and in proportion to two components of the apparent energy traversing a circuit, and means for producing combined indications of said components.

8. An electric meter comprising two indicating devices actuated respectively by and in proportion to two components of the apparent energy traversing a circuit, the said indicators having lines of motion at approximately the same mechanical angle to each other as the electrical angle between the said components.

9. An electric meter comprising one indicating device actuated in proportion to the true energy component of the apparent energy traversing a circuit, and another indicating device actuated in proportion to another component of the apparent energy, the said indicators having lines of motion at approximately the same mechanical angle to each other as the electrical angle between the said components.

10. An electric meter comprising a device actuated in proportion to the true energy component of the apparent energy traversing a circuit, a device actuated in proportion to another component of the apparent energy, and means for producing by said devices combined indications of said components.

11. An electric meter comprising a device for indicating the true energy of the current traversing a circuit, a device for indicating the wattless component of said current, and means for combining said indications to show the apparent watts and the power factor of said current.

12. An electric meter comprising two indicators actuated respectively in proportion to two components of the apparent energy traversing a circuit, the said indicators having motions in lines at approximately the same mechanical angle to each other as the electrical angle between the said components, and a scale over which said indicators move provided with circular divisions representing apparent energy values, radial divisions representing power factor values, and two sets of marginal divisions respectively representing the values of the true energy and the wattless components of the apparent energy.

13. An electric meter comprising mechanisms actuated respectively in proportion to two components of the apparent energy traversing a circuit, and devices including systems of links and pointers moving parallel to themselves operated respectively by said mechanisms to produce a combined indication.

14. An electric meter comprising mechanisms actuated respectively in proportion to two components of the apparent energy traversing a circuit, and indicators operated respectively by said mechanisms and moving parallel to themselves and disposed at approximately the same mechanical angle to each other as the electrical angle between the said components.

15. A meter for measuring the energy of a polyphase current in a circuit comprising two pairs of mechanically coupled wattmeters each having a current winding and a voltage winding, the voltage windings of the meters of one pair being associated respectively with the same phases of the current in said circuit as the corresponding current windings, while those of the meters of the other pair are associated with phases of said current other than the corresponding current windings.

16. In an electric meter having appropriately movable indicating devices, a scale having circular divisions representing apparent energy values, radial divisions representing power factor values, and two sets of marginal divisions respectively representing values of the true energy component and of the wattless components of apparent energy of current in the circuit being measured, substantially as described.

In testimony whereof I have hereunto signed my name in the presence of the two subscribed witnesses.

PAUL M. LINCOLN.

Witnesses:
FREDK. STAUB,
W. A. HECKMAN.